(12) United States Patent
Satsuma

(10) Patent No.: US 7,589,493 B2
(45) Date of Patent: Sep. 15, 2009

(54) CHARGER

(75) Inventor: Eiji Satsuma, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 334 days.

(21) Appl. No.: 11/526,672

(22) Filed: Sep. 26, 2006

(65) Prior Publication Data
US 2007/0139004 A1 Jun. 21, 2007

(30) Foreign Application Priority Data

Sep. 29, 2005 (JP) .............. 2005/285639

(51) Int. Cl.
*H02J 7/00* (2006.01)
*H01M 10/44* (2006.01)
*H01M 2/10* (2006.01)

(52) U.S. Cl. .............. 320/107; 320/137; 429/52; 429/99; 429/100

(58) Field of Classification Search .......... 320/107, 320/137
See application file for complete search history.

(56) References Cited

U.S. PATENT DOCUMENTS 5,541,489 A * 7/1996 Dunstan .............. 320/134
6,152,597 A * 11/2000 Potega .............. 374/185

FOREIGN PATENT DOCUMENTS

JP 5-30669 2/1993
JP 2002-199609 7/2002

* cited by examiner

*Primary Examiner*—Edward Tso
*Assistant Examiner*—Yalkew Fantu
(74) *Attorney, Agent, or Firm*—Wenderoth, Lind & Ponack, L.L.P.

(57) ABSTRACT

A charger including a first charging terminal that contacts one of positive and negative terminals of a rechargeable battery to charge the battery; and a second charging terminal that is opposite in polarity to the first charging terminal electrically connected to a charging circuit. The first charging terminal has a nip portion that is formed by bending a metal plate in a folded manner such that parts of the metal plate are opposed. A temperature sensor is disposed in the nip portion. The temperature sensor disposed in the nip portion detects the battery temperature through the intermediary of the metal plate of the first charging terminal in contact with the terminal of the rechargeable battery.

13 Claims, 9 Drawing Sheets

CHARGER

BACKGROUND OF THE INVENTION

1. Field of the Invention

The present invention relates to a charger that charges a battery while detecting the temperature of the battery to be charged.

2. Description of the Related Art

Chargers that charge rechargeable batteries of AA battery, AAA battery and so on while detecting the battery temperature have been developed. Charging of batteries, if the battery temperature abnormally rises causes deterioration of battery performance. For this reason, chargers charge batteries while detecting the battery temperature. When a battery is charged, its temperature rises. Particularly, when a battery is close to full charge, its temperature sharply rises. An abnormal rise of battery temperature causes deterioration of battery characteristics. In order to prevent deterioration of battery performance, a charger that has a temperature sensor for detecting the battery temperature has been developed (see Japanese Patent Laid-Open Publication TOKUKAI No. 2002-199609 and Japanese Patent Laid-Open Publication TOKUKAI No. HEI 5-30669).

There are many types of chargers that detect the temperature of rechargeable batteries that are mounted to a battery mounting portion and in direct contact with a sensor. Typically, a temperature sensor such as a thermistor is disposed in a gap between cylindrical batteries that are arranged in parallel to each other, and thus, the battery temperature is detected. However, it is difficult for a charger of this type of structure to accurately detect the battery temperature. The reason is that temperature detection precision of temperature sensor depends on its environment. This causes variation of the detection temperature depending on the air temperature around the temperature sensor. In particular, in the structure that has a temperature sensor disposed on the side of a battery and a cooling fan disposed in a case for forcedly blowing cooling air on the rechargeable battery, the temperature sensor is cooled by the cooling air, and thus cannot accurately detect the battery temperature.

On the other hand, a charger having a temperature sensor such as a ceramic thermistor disposed not on the side of a battery but on the back side of a charging terminal of the charger for charging the battery has also been developed. In this structure, as shown in FIG. 16, a ceramic thermistor 94 is disposed on the back side of a charging terminal 97, and is thermally conductively connected to the charging terminal 97 with solder, or the like. However, this structure also cannot eliminate environmental influence of the temperature sensor. The reason is that, since the ceramic thermistor held on the back side of the terminal is exposed, it is affected by the environmental temperature of a battery.

In addition, a charger having a temperature sensor that is in contact with a terminal of a battery through the intermediary of a metal cylinder has also been developed. As shown in FIG. 17, this charger is provided with charging terminals 87 and a temperature sensor 84. The charging terminals 87 are made of elastically deformable metal plates by bending. The temperature sensor 84 is disposed close to the lower part of the contact portions 87a of the charging terminals 87, and detects the battery temperature. This temperature sensor 84 is pressed against a terminal of a battery through the intermediary of a metal cylinder 82. This metal cylinder 82 is made of an elastic metal plate 81 with top ends deformed in a cylindrical shape, and accommodates the cylindrical temperature sensor 84 in contact with each other. The elastic metal plate 81 elastically presses the metal cylinder 82 against a battery that is mounted in the charger. Since heat from the battery can be efficiently conducted to the temperature sensor 84 through the metal cylinder 82 that is pressed against the terminal of the battery, this structure has a feature that can quickly detect the battery temperature by the temperature sensor 84.

However, in this structure, it is necessary to insert the temperature sensor into the interior of the metal cylinder so that they are in contact with each other, and additionally to press this metal cylinder against the terminal of the battery through the intermediary of the elastic metal plate, and so on. For this reason, this structure has disadvantages that require time and effort for arrangement of the temperature sensor and the number of parts is increased, as a result, it is difficult to reduce manufacturing costs. In addition, in this structure, since the temperature sensor 84 and the metal cylinder 82 are disposed on the interior side of the charging terminals 87 (i.e., battery side), when a fan blows cooling air on the batteries to cool the batteries to be charged, the metal cylinder that is disposed on the battery side is often affected by the cooling air, or the like. Accordingly, there is a problem that the possibility of detection temperature error cannot be eliminated.

SUMMARY OF THE INVENTION

The present invention is aimed at solving the problems with the known chargers. It is a main object of the present invention to provide a charger with a simple configuration capable of accurately detecting the battery temperature of a rechargeable battery.

To solve the problems, a charger according to the present invention has the following configuration. The charger according to the present invention comprises a case that has a battery mounting portion for detachably mounting a rechargeable battery to be charged; a charging circuit that is disposed inside the case, and charges the rechargeable battery mounted in the battery mounting portion; a first charging terminal that is electrically connected to the charging circuit, and contacts one of positive and negative terminals of the rechargeable battery mounted in the battery mounting portion to charge the battery; and a second charging terminal that is opposite in polarity to the first charging terminal and is electrically connected to the charging circuit. The first charging terminal has a nip portion that is formed by bending a metal plate in a folding manner such that parts of the metal plate are opposed, and the temperature sensor is disposed in the nip portion. The temperature sensor disposed in the nip portion detects the battery temperature through the intermediary of the metal plate of the first charging terminal in contact with the terminal of rechargeable battery.

The aforementioned charger has a really inexpensive configuration but can improve the precision of effective temperature sensing. The reason is that the charger according to the present invention comprises the first charging terminal that contacts one of positive and negative terminals of the rechargeable battery mounted to the battery mounting portion to charge the battery; and the first charging terminal has a nip portion that is formed by bending a metal plate in a folding manner such that parts of the metal plate are opposed, and the temperature sensor is disposed in the nip portion, and additionally the temperature sensor disposed in the nip portion detects the battery temperature through the intermediary of the metal plate of the first charging terminal in contact with the terminal of the rechargeable battery. That is, both surfaces of the temperature sensor are nipped by the metal plate as a heat source that is in contact with the terminal of the rechargeable battery to be sensed, as a result, the temperature sensor is thermally shielded. Therefore, the temperature sensor can accurately detect the temperature.

In the charger according to the present invention, the temperature sensor can be a film-type temperature sensor.

In this charger, the temperature sensor is a film-type temperature sensor, and thus, the temperature sensor has a plane shape. Accordingly, both surfaces of the temperature sensor can be easily nipped. Therefore, it is possible to surely provide a thermal shield effect and high precision temperature sensing. In other words, the temperature sensor is less affected by the environment of the battery, and consequently, it is possible to provide a feature that can accurately detect the battery temperature.

Furthermore, in the present invention, in the case where the nip portion of the first charging terminal is located on the back side of the first charging terminal with respect to the rechargeable battery, the temperature sensor is less affected by cooling air or movement of air. Therefore, it is possible to accurately detect the temperature of the rechargeable battery.

In the charger according to the present invention, the first charging terminal with the temperature sensor disposed therein can contact the negative terminal of the rechargeable battery.

In the charger according to the present invention, a fan that forcedly blows cooling air on the battery mounting portion to cool the rechargeable battery can be disposed inside the case.

In the charger according to the present invention, the bottom of the battery mounting portion can have a ventilation opening that allows cooling air to pass, and a fan can forcedly blow the cooling air on the rechargeable battery in the battery mounting portion through the ventilation opening.

In the charger according to the present invention, the nip portion of the first charging terminal can be located on the back side of the first charging terminal with respect to the rechargeable battery.

The above and further objects and features of the invention will more fully be apparent from the following detailed description and the accompanying drawings.

DETAILED DESCRIPTION OF THE PREFERRED EMBODIMENTS

A charger shown in FIGS. 1 through 6 is provided with a battery mounting portion 2 that can detachably mount rechargeable batteries 3 and is located on the top side of a case 1. The battery mounting portion 2 of the charger mounts the rechargeable batteries of AAA batteries 3B or AA batteries 3A to charge each battery at suitable charging current, respectively. A control circuit (not shown) is disposed inside the case 1. The control circuit discriminates types of the batteries that are mounted to the battery mounting portion 2 and controls the charging current.

Figure 1:
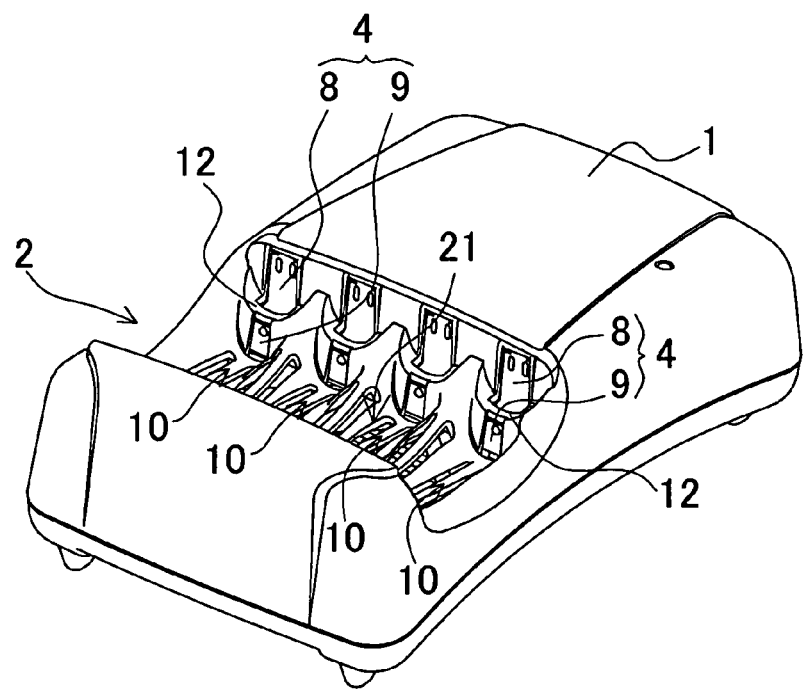
FIG. 1 is a perspective view of a charger according to one embodiment of the present invention.
Figure 2:
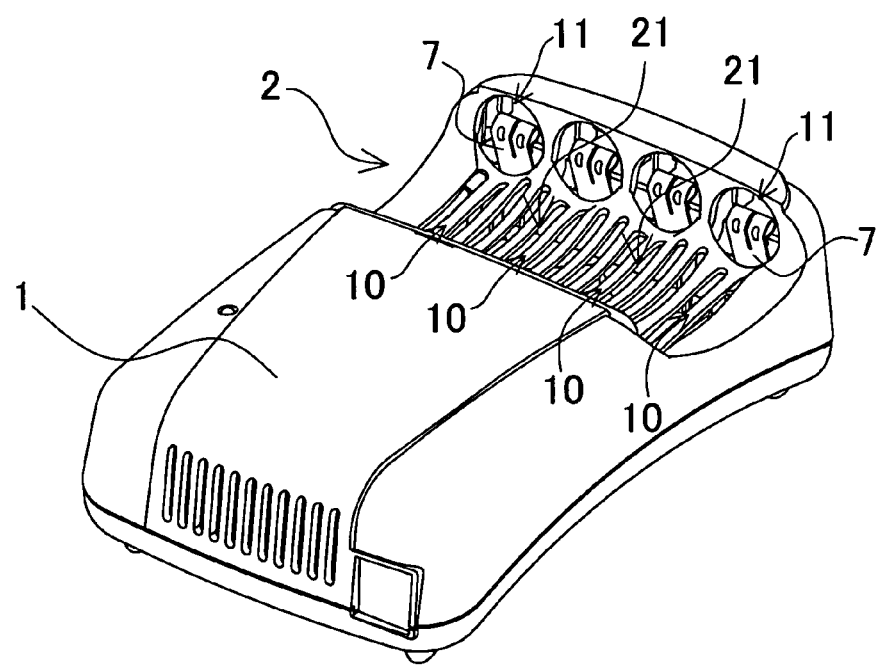
FIG. 2 is a perspective back view of the charger shown in FIG. 1.
Figure 5:
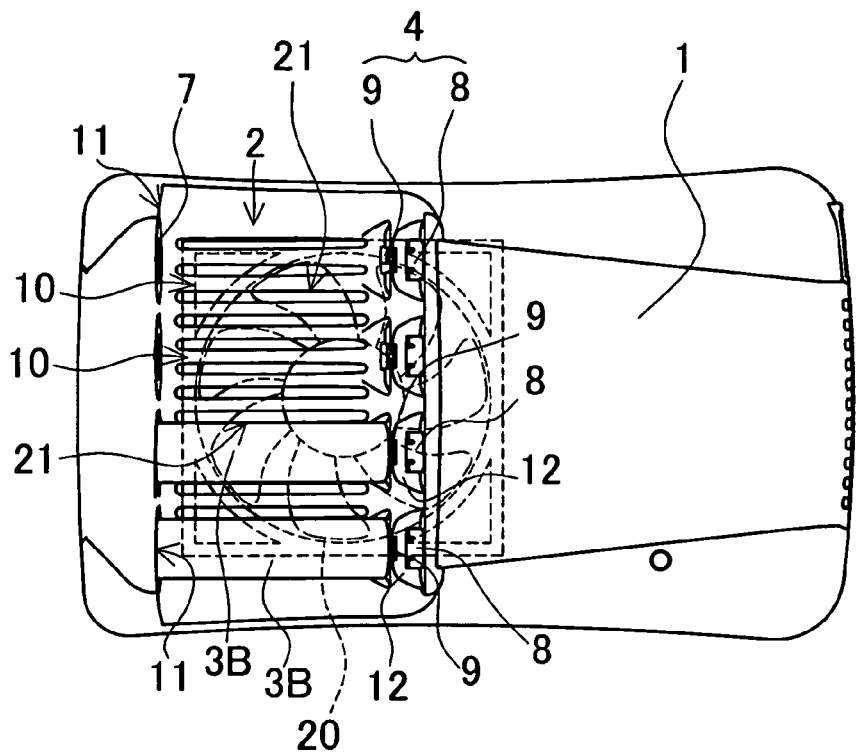
FIG. 5 is a plan view showing a state in which a AAA battery is attached to the charger shown in FIG. 1.
Figure 6:
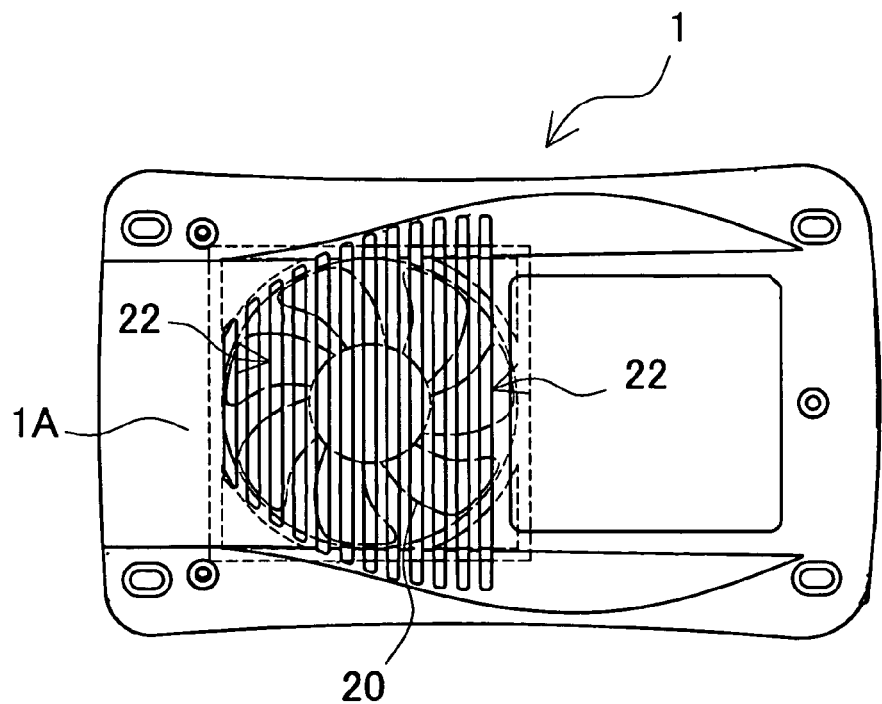
FIG. 6 is a bottom view of the charger shown in FIG. 1.

The battery mounting portion 2 mounts a plurality of cylindrical rechargeable batteries 3 side by side, in parallel. In the charger, as shown in FIGS. 1, 2 and 5, the battery mounting portion 2 is provided with battery pockets 10 that are aligned in four columns and mount four batteries in parallel.

The battery mounting portion 2 can mount either AA batteries 3A or AAA batteries 3B in the battery pockets 10, respectively. In the battery mounting portion 2, a guiding opening 11 that accommodates an end of AA battery 3A or AAA battery 3B is disposed on one end side of each battery pocket 10, while a stair rest portion 12 that receives the AA battery 3A thereon to hold it in place is disposed on the other side. The stair rest portion 12 receives the AA battery 3A thereon to hold it in place, and, on the other hand, receives the AAA battery 3B on the inside thereof to hold it into place. The stair rest portion 12 of the battery mounting portion 10 mounts the AA battery 3A or the AAA battery 3B in place such that one of its ends is located at one of positions deviated in the top-and-bottom direction. The AA battery 3B has a substantially cylindrical shape and a shorter length in the longitudinal direction as compared with a AA battery. From this point of view, the AAA battery 3B is a shorter battery. Contrary to this, the AA battery 3A has a substantially cylindrical shape and a longer length in the longitudinal direction as compared with the AAA battery. From this point of view, the AA battery 3A is a longer battery.

In addition, in the charger shown in FIGS. 1 through 6, a fan 20 is disposed inside the case 1. The fan 20 forcedly blows air on the battery mounting portion 2 to forcedly cool the rechargeable batteries 3 to be charged with the cooling air. The charger is provided with ventilation openings 21 that are disposed on the bottom of the battery mounting portion 2. The ventilation openings 21 penetrate the bottom of the battery mounting portion 2. In the case 1, the ventilation openings 21 are a plurality of slits aligned in parallel. The fan 20 is disposed inside the case 1 with the ventilation openings 21. The fan 20 sucks air in the case 1 and blows it to the ventilation openings 21 to forcedly cool the rechargeable batteries 3 in the battery mounting portion 2. The case 1 has suction ports 22 for outside air that are opened on a bottom plate 1A. When the fan 20 is operated, air is sucked from the suction ports 22 into the case 1. The fan 20 accelerates the sucked air and forcedly blows it through the ventilation openings 21 on the battery mounting portion 2 to cool the rechargeable batteries 3. The ventilation openings 21 are a plurality of slits that are opened in parallel to the battery pockets 10 on the bottom part of the battery mounting portion 2. The ventilation openings can be slits that are arranged perpendicular to the battery pockets, or many circular holes.

When the battery temperature rises higher than specified temperature, the fan 20 is operated to forcedly blow cooling air on the rechargeable battery 3 for cooling. Note that the fan 20 can be constantly operated during charging the rechargeable batteries 3, and thus, the rechargeable batteries 3 can be charged while being cooled.

In the battery mounting portion 2, first and second charging terminals 7 and 4 are disposed on both ends of each battery pocket 10. The first and second charging terminals 7 and 4 are disposed outward of the ventilation openings 21 that are opened on the bottom of the battery mounting portion 2. In other words, the ventilation openings 21 are open between the first and second charging terminals 7 and 4, and inward of them. In this charger cooling air is not blown by the fan 20 directly on the first charging terminals 7. Accordingly, temperature sensors 14 that are nipped by the first charging terminals 7 can more accurately detect the battery temperature.

The first and second charging terminals 7 and 4 contact both terminals of the rechargeable battery 3 mounted in the battery mounting portion 2 to provide charging current to the rechargeable battery 3. The first and second charging terminals 7 and 4 are made of an elastically deformable metal plate, such as nickel plate, copper plate and copper alloy plate including phosphor bronze, which has excellent electrical conductivity and heat conductivity.

Figure 3:
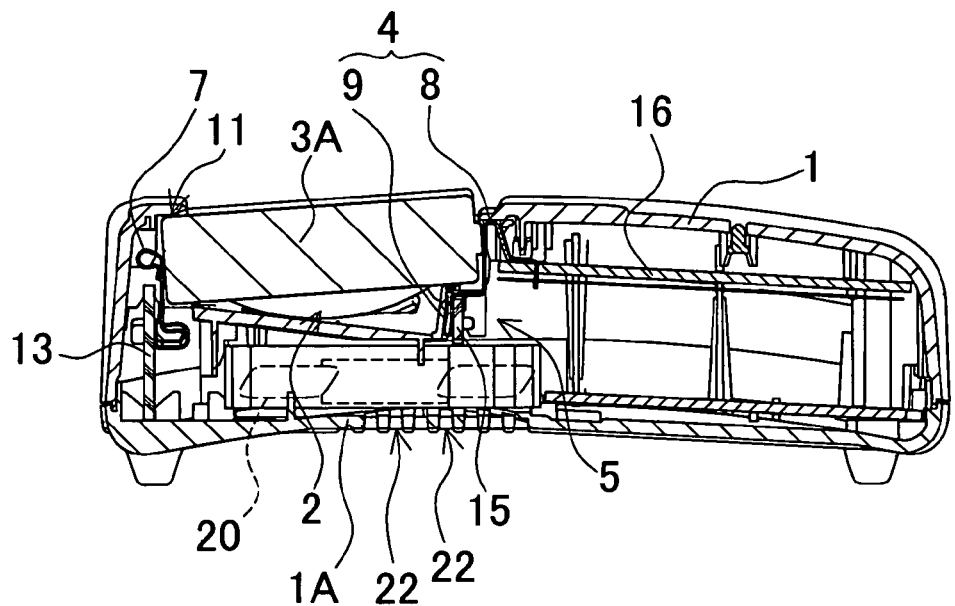
FIG. 3 is a cross-sectional view showing a state in which a AA battery is attached to the charger shown in FIG. 1.
Figure 4:
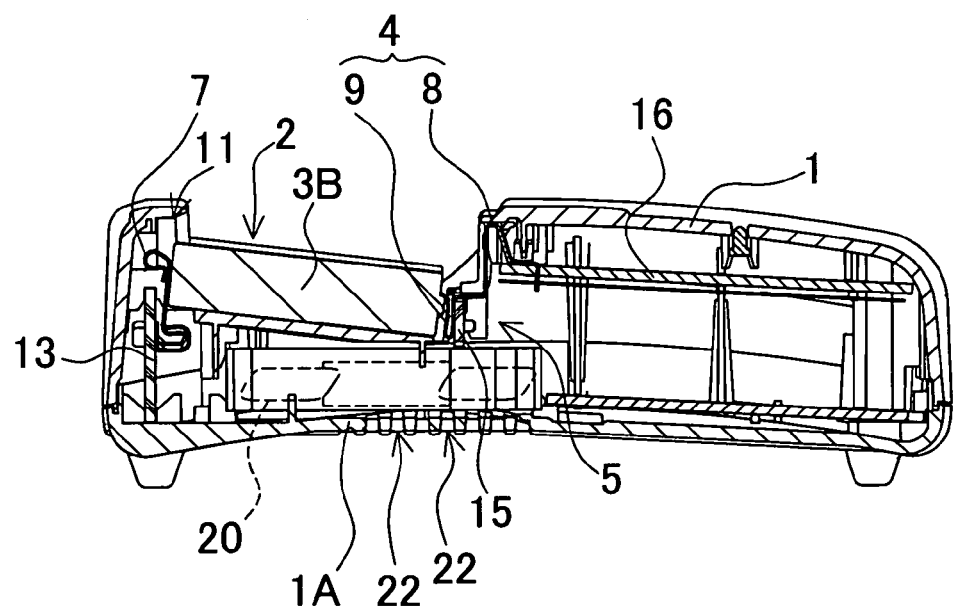
FIG. 4 is a cross-sectional view showing a state in which a MA battery is attached to the charger shown in FIG. 1.

In the charger shown in FIGS. 1 through 5, the first charging terminal 7 is a charging terminal that is disposed on one end side of the battery pocket 10, while the second charging terminal 4 is a charging terminal that is disposed on the other end side. In this charger, the second charging terminal 4 includes a AA battery charging terminal 8 that contacts a terminal of the AA battery 3A, and a AAA battery charging terminal 9 that contacts a terminal of the AAA battery 3B. The first charging terminal 7 is disposed inside the guiding opening 11, and contacts either the AA battery 3A or the AAA battery 3B that is inserted into the guiding opening 11. This charger charges the AA battery 3A in the state in which the first charging terminals 7 and the AA battery charging terminal 8 of the second charging terminal 4 contact the terminals at both ends of the rechargeable battery 3 for charging. On the other hand, this charger charges the AAA battery 3B in the state where the first charging terminals 7 and the AAA battery charging terminal 9 of the second charging terminal 4 contact the terminals at both ends of the rechargeable battery 3 for charging. In addition, as shown in FIGS. 3 and 4, the AA battery 3A is mounted on the stair rest portion 12 in an upper stair, while the AAA battery 3B is mounted inside of the stair portion 12 in a lower stair. In this charger, as shown in FIG. 4, the AAA battery 3B is mounted in a lower part with respect to the AA battery 3A when being charged.

Figure 7:
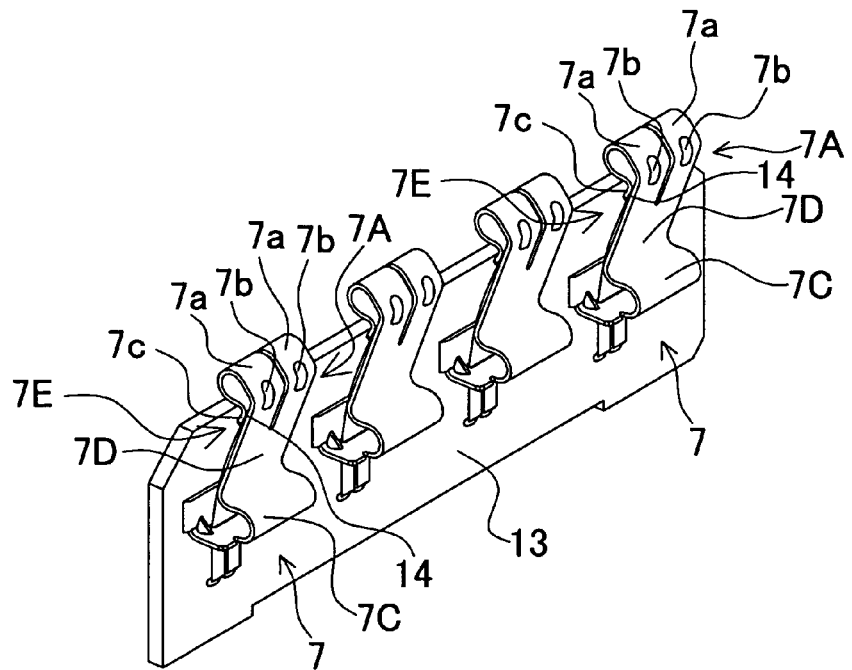
FIG. 7 is a perspective view showing a first charging terminal.
Figure 8:
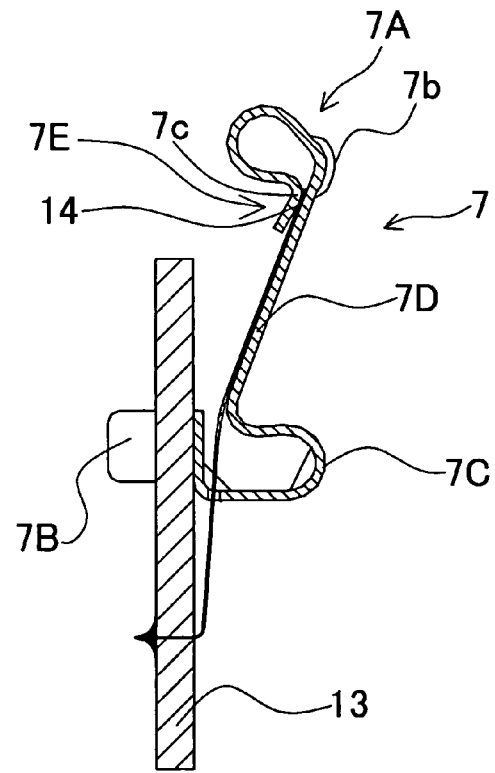
FIG. 8 is a cross-sectional view of the first charging terminal shown in FIG. 7.

FIGS. 7 and 8 show the first charging terminal 7. The first charging terminal 7 contacts the negative terminal (flat terminal) of the rechargeable battery 3 that is mounted in the battery pocket 10. As shown in the cross-sectional view of FIG. 8, the first charging terminal 7 is made of an elastically deformable metal plate by bending. The first charging terminal 7 has a fastening portion 7B. The fastening portion 7B is a bent portion that is fastened to a circuit board 13 and formed by bending one end of the metal plate at a right angle. The fastening portion 7B is connected to an elastically deformed portion 7C that is bent in a U-shape. In addition, the elastically deformed portion 7C is connected to an elastic arm portion 7D that is formed by bending a connection part of the elastically deformed portion 7C at an angle greater than a right angle. A contact portion 7A that contacts the terminal of the rechargeable battery 3 is disposed at the fore end of the elastic arm portion 7D.

The contact portion 7A of the first charging terminal 7 is branched in two parts. Each of branched parts 7a is provided with a projection 7b that protrudes toward the terminal at an edge surface of the battery. The protrusion 7b is pressed and contacts the terminal of the rechargeable battery 3 to prevent poor contact.

In addition, the first charging terminal 7 has a nip portion 7E that is disposed at the fore end of the elastic arm portion 7D on the back side of the first charging terminal 7 away from the battery to be mounted. The nip portion 7E is formed by bending the metal plate in a folding manner such that parts of the metal plate are opposed. In the first charging terminal 7, a fore end 7c of the contact portion 7A is folded toward the back side of the contact portion 7A by bending such that the fore end 7c is arranged close to the back surface of the elastic arm portion 7D to form the nip portion 7E. The nip portion 7E is composed of opposed parts of metal plate and holds the temperature sensor 14 in place. The temperature sensor 14 is nipped by the metal plate located on the both surfaces thereof and held in place. The metal plate that nips both surfaces of the temperature sensor 14 is in contact with both surfaces of the temperature sensor 14, and provides excellent thermal coupling. Additionally, the metal plate in contact with both surfaces of the temperature sensor 14 is one continuous sheet of metal plate that contacts the terminal of the rechargeable battery 3 and is heated by the heat of the battery. In the metal plate that nips both surfaces of the temperature sensor 14, one side of the metal plate comes in contact directly with the terminal of the rechargeable battery 3. The heat is effectively thermally conducted to the metal plate in contact with the terminal of the rechargeable battery 3 from the terminal of the battery. The heat that is thermally conducted to the metal plate from the battery is thermally conducted to other part of the metal plate that holds the other surface of the temperature sensor 14. The reason is that a metal plate has excellent thermal conductivity. For this reason, to the temperature sensor 14, the heat is effectively thermally conducted from the metal plate that holds both surfaces of the temperature sensor 14. Therefore, the temperature sensor 14, which is nipped by the nip portion 7E composed of the metal of the first charging terminal 7, quickly and accurately detects the battery temperature.

In addition, the temperature sensor 14 is not cooled by cooling air that forcedly cools the rechargeable battery 3, and thus can accurately detect the temperature of the rechargeable battery 3. The reason is that the heat is conducted to the temperature sensor 14 through both of its surfaces in the state in which both surfaces of the temperature sensor 14 are nipped by the metal plate that is heated by the terminal of the rechargeable battery 3, and additionally, the temperature sensor 14 is prevented from being cooled by the cooling air.

In addition, since the temperature sensor 14 is located on the back side of the first charging terminal 7 away from the battery to be mounted, the temperature sensor 14 is less affected by the cooling air blown on the battery, and thus it can accurately detect the temperature of the rechargeable battery 3. Additionally, in this configuration, not only in the case where cooling air is blown on the battery, but also in the case where cooling air does not exist, when the charger is used indoors and outdoors with sufficient air movement, the temperature sensor 14 is less affected by air movement, and thus can accurately detect the temperature of the rechargeable battery 3.

The temperature sensor 14 that is disposed in the nip portion 7E of metal plate is a film-type temperature sensor. The film-type of temperature sensor 14 is composed of a temperature sensing element, such as a thermistor, both surfaces of which are covered by plastic films insulating films. In other words, it is a temperature sensing element that is interposed between two sheets of plastic films. The film-type of temperature sensor 14 is thin, and is nipped by the nip portion 7E composed of parts of the metal plate positioned close to each other.

In the charger of the aforementioned configuration, both surfaces of the temperature sensor 14 are held by the metal plate of the first charging terminal 7 as a heat detection surface. Accordingly, the temperature is equally conducted through each surface, and as a result, any external influence on the detected temperature is minimized. Therefore, it is possible to provide highly precise and reliable temperature detection. In particular, in the structure where the film-type temperature sensor 14 is nipped between the parts of the bent metal plate, though the structure is simple, since the bent metal plate also serves to fasten the temperature sensor 14, this structure can save time and effort required in conventional operations such as the process of fastening a temperature sensor, such as a thermistor, by molding a silicon resin around the thermistor. Consequently, the manufacturing costs can be reduced.

Figure 9:
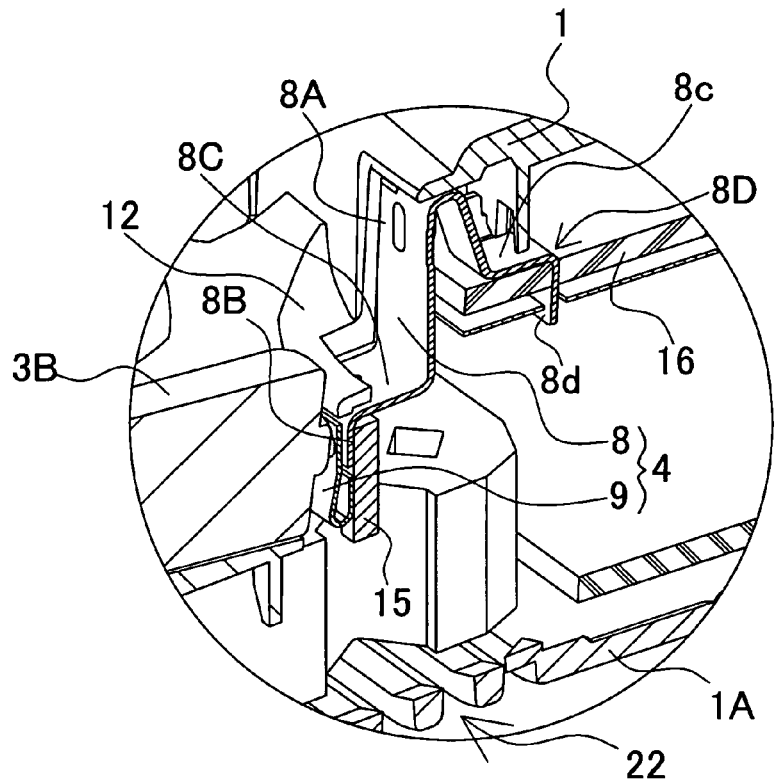
FIG. 9 is a perspective view showing a discrimination switch mechanism partially shown in a cross-sectional view.
Figure 10:
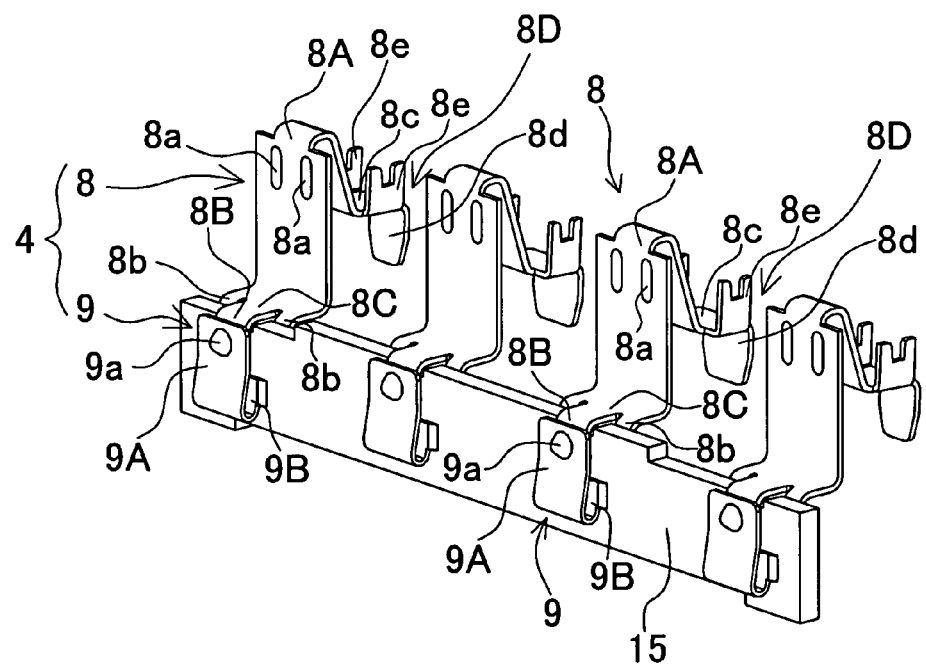
FIG. 10 is a perspective view showing AA and AAA battery charging terminals in the discrimination switch mechanism shown in FIG. 9.
Figure 11:
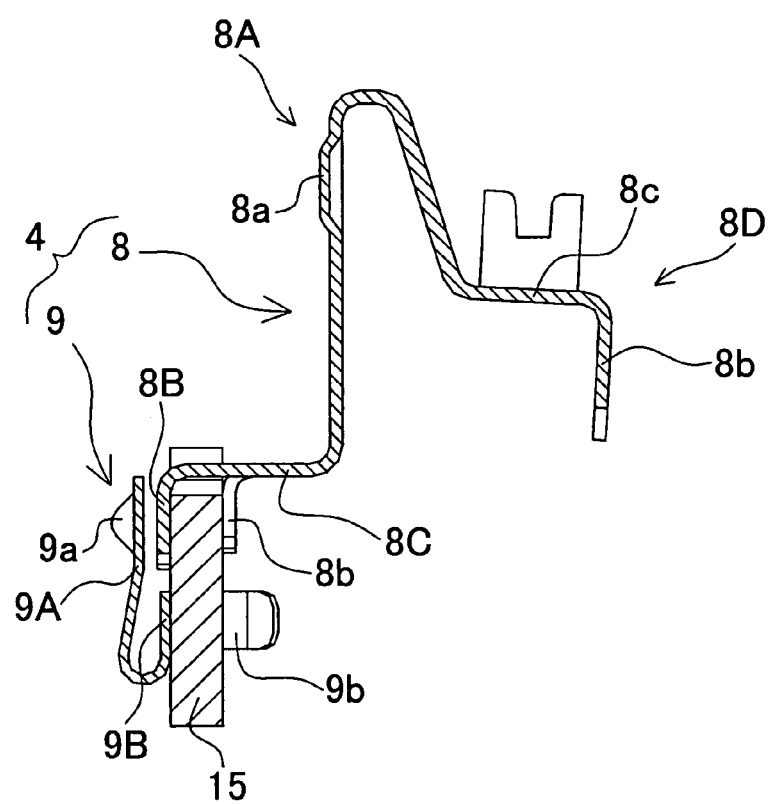
FIG. 11 is a cross-sectional view of the AA and AAA battery charging terminals shown in FIG. 10.

The charger includes a discrimination switch mechanism 5 that discriminates between types of batteries mounted in the battery mounting portion 2, i.e., AA battery 3A or AAA battery 3B. The discrimination switch mechanism 5 is a switch that is pressed by the battery mounted in the battery mounting portion 2, and thus the switch is turned between ON and OFF states. In the charger of FIGS. 9 through 11, the discrimination switch mechanism 5 is composed of the AAA battery charging terminal 9 and the AA battery charging terminal 8.

The AAA battery charging terminal 9 that is also used for the discrimination switch mechanism 5 is formed by processing a metal plate into a U-shape. In this AAA battery charging terminal 9, a fastening end 9B at the base end thereof is fastened to an insulating board 15, while the fore end serves as a contact arm portion 9A. Insertion walls 9*b* are disposed on both sides of the fastening end 9B. The insertion walls 9*b* are inserted into slits that are disposed on the insulating board 15, and thus fasten the AAA battery charging terminal 9 in place. The fastening end 9B of the AAA battery charging terminal 9 is fastened to the insulating board 15 by soldering the insertion walls 9*b*. This structure can fasten the AAA battery charging terminal 9 at an accurate position in the insulating board 15. The insulating board 15 is fastened to the case 1 in an upright posture. The upper part of the contact arm portion 9A elastically presses the protrusion terminal, which serves as the positive terminal of the AAA battery 3B, to come in contact with each other. A protrusion 9*a* is disposed on a contact surface of the contact arm portion 9A to be in contact with the AAA battery 3B. The protrusion 9*a* is pressed against the terminal.

The AAA battery charging terminal 9 is pressed by the terminal of the AAA battery 3B that is mounted in the battery mounting portion 2, and comes into contact with the AA battery charging terminal 8. In the state in which the AAA battery charging terminal 9 is not pressed by the AAA battery 3B, the AAA battery charging terminal 9 deviates away from and comes out of contact with the AA battery charging terminal 8.

The AA battery terminal 8 that composes the discrimination switch mechanism 5 is formed by bending a metal plate. The fore end of the AA battery charging terminal 8 is bent downward at a right angle to form a bent end 8B. This bent end 8B is fastened to the insulating board 15 to which the AAA battery charging terminal 9 is fastened. The bent end 8B is fastened above the fastening end 9B of the AAA battery charging terminal 9 so as to be spaced away from the AAA battery charging terminal 9. The AA battery charging terminal 8 is fastened to the insulating board 15 such that the bent end 8B is located on the back side of the contact arm portion 9A of the AAA battery charging terminal 9.

In this discrimination switch mechanism 5, the AAA battery 3B to be mounted in the battery mounting portion 2 presses the contact arm portion 9A of the AAA battery charging terminal 9 against the bent end 8B of the AA battery charging terminal 8, and thus, the AAA battery charging terminal 9 comes in contact with the AA battery charging terminal 8. When the AAA battery 3B is not mounted in the battery mounting portion 2, the contact arm portion 9A of the AAA battery charging terminal 9 is not pressed by the rechargeable battery 3. In this state, the AAA battery charging terminal 9 is deviated away from and comes out of contact with the AA battery charging terminal 8. The AAA battery charging terminal 9, which is composed of an elastically deformable metal plate, is processed in a U-shape that is not in contact with the AA battery charging terminal 8 in the state in which the AAA battery charging terminal 9 is not pressed by the AAA battery 3B.

In addition, the AA battery charging terminal 8 has a horizontal portion 8C that extends rearward from the bent end 8B. The horizontal portion 8C is disposed inside the stair rest portion 12. A contact portion 8A for the AA battery 3A is disposed so as to be bent upward from the horizontal portion 8C. A fastening portion 8D at the rear end is formed by folding the contact portion 8A at the top end, and is fastened to the circuit board 16. As shown in FIGS. 10 and 11, clip lugs 8*b* that hold the back surface of the insulating board 15 are disposed at both sides of the horizontal portion 8C. The clip lugs 8*b* are bent downward along the back surface of the insulating board 15. This AA battery charging terminal 8 sandwiches the insulating board 15 with the bent end 8B and the clip lugs 8*b* that hold both surfaces of the insulating board 15. The AA battery charging terminal 8 is simply and easily, but firmly fastened in place to the insulating board 15. A protrusion 8*a* is disposed on a contact surface of the contact portion 8A to be in contact with the AA battery 3A. The protrusion 8*a* is pressed against the terminal of the battery.

The fastening portion 8D, as the rear end of the AA battery charging terminal 8, has a horizontal section 8*c* that extends rearward, and an insertion section 8*d* that passes through the circuit board 16. As shown in FIG. 10, the horizontal section 8*c* has side walls 8*e* that are formed by bending both sides thereof upward. The side walls 8*e* have recesses that accommodate an inner wall of the case 1 fitted therein. In this AA battery charging terminal 8, the inner wall of the case 1 is fitted in the recesses of the side walls 8*e*, and thus, the AA battery charging terminal 8 can be placed at a predetermined position of the case 1.

Figure 12:
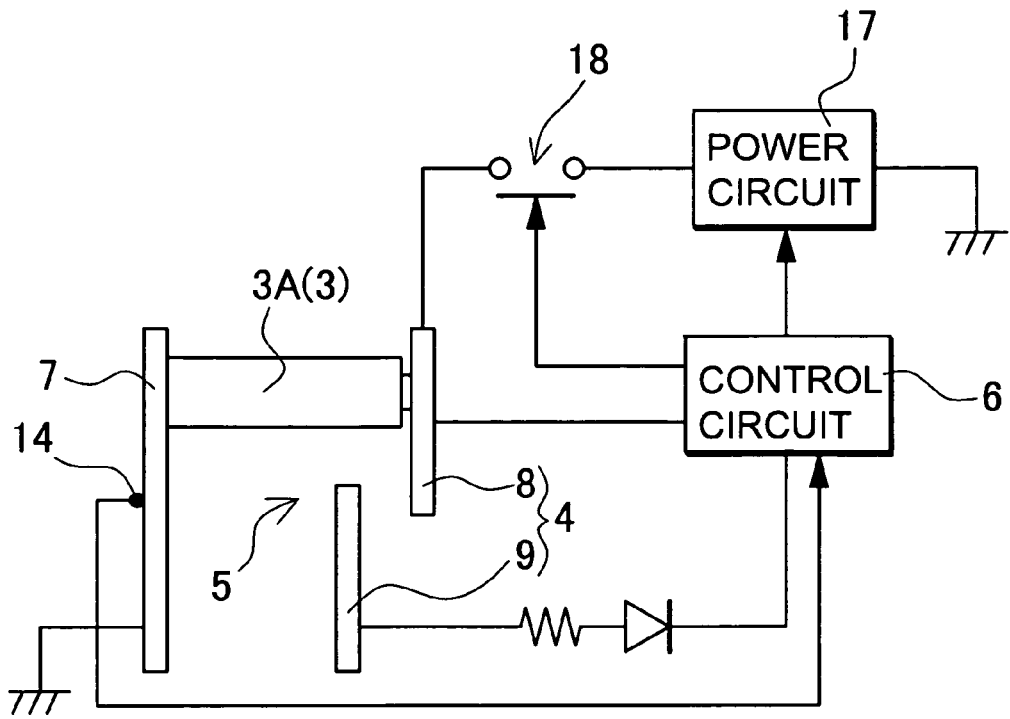
FIG. 12 is a circuit diagram showing a charger according to one embodiment of the present invention, with a AA battery being mounted thereto.
Figure 13:
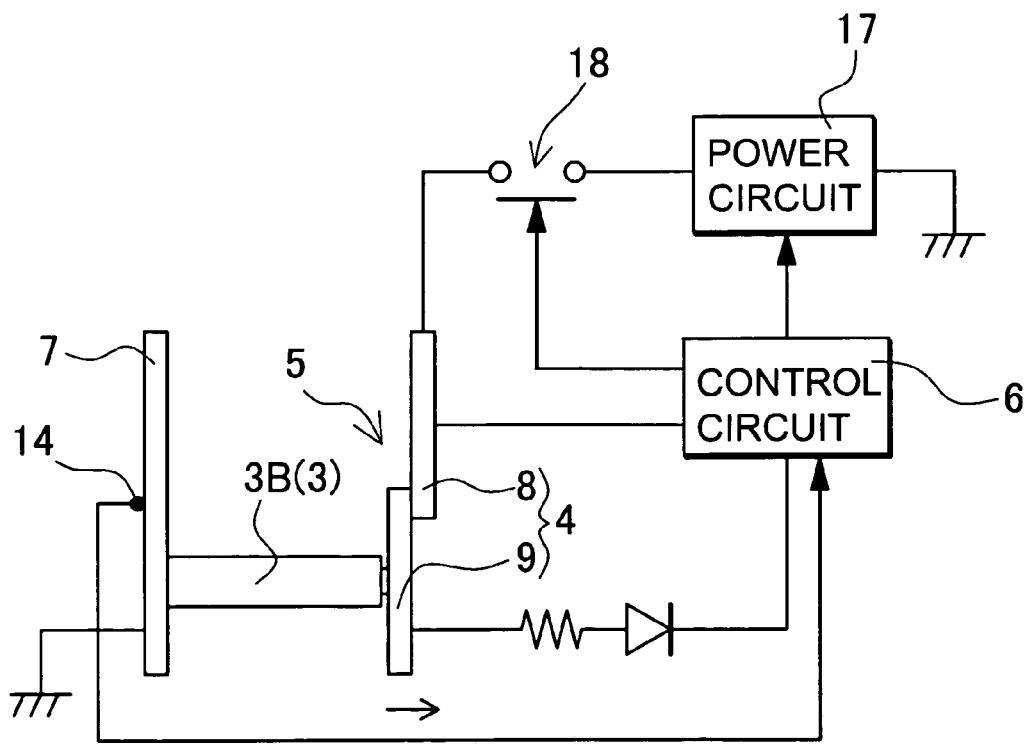
FIG. 13 is a circuit diagram showing the charger according to one embodiment of the present invention, with a AAA battery being mounted thereto.

FIGS. 12 and 13 show circuit diagrams of the aforementioned charger. This charger includes a control circuit 6 that controls charging current for the rechargeable battery 3 mounted in the battery mounting portion 2 based on signals from the temperature sensor 14 and the discrimination mechanism 5, and a power circuit 17 that charges the rechargeable battery 3 at suitable charging current based on control by the control circuit 6. The AA battery charging terminal 8 is connected to the power circuit 17 via a charging switch 18. The AAA battery charging terminal 9 is connected to the power circuit 17 via the AA battery charging terminal 9. This AAA battery charging terminal 9 charges the AAA battery 3B in the state in which it is in contact with the AA battery charging terminal 8. The charging switch 18 is switched to ON when the rechargeable battery 3 is charged, and to OFF when it is not charged based on the control of the control circuit 6.

The control circuit 6 detects the battery temperature based on the signal from the temperature sensor 14. When the battery temperature rises higher than the maximum temperature, the control circuit 6 cuts off the charging current to stop charging of the battery, or reduces the charging current, and thus reduces the battery temperature. When the battery temperature is lower than the specified temperature, the control circuit 6 charges the rechargeable battery 3 at normal charging current.

The control circuit 6 detects the voltage of the AA battery charging terminal 8 and the AAA battery charging terminal 9, and ON/OFF of the discrimination switch mechanism 5, and thus controls the charging current for the rechargeable battery 3. In the charger of the circuit configuration shown the figure, when detecting ON/OFF of the discrimination switch mechanism 5, the control circuit 6 turns the charging switch 18 to OFF. After detecting the type of the rechargeable battery 3 based on ON/OFF of the discrimination switch mechanism 5, the control circuit 6 turns the charging switch 18 to ON, and starts charging the rechargeable battery 3.

When the control circuit 6 detects the battery voltage in both the AA battery charging terminal 8 and the AAA battery charging terminal 9, the control circuit 6 detects ON of the discrimination switch mechanism 5. When the control circuit 6 detects ON of the discrimination switch mechanism 5, the control circuit 6 determines that the mounted rechargeable battery 3 is the MA battery 3B. FIG. 13 shows this state. When the control circuit 6 detects the battery voltage in the AA battery charging terminal 8 but does not detect the battery voltage of the AAA battery charging terminal 9, the control circuit 6 detects OFF of the discrimination switch mechanism 5. When the control circuit 6 detects the OFF state of the discrimination switch mechanism 5, the control circuit 6 determines that the mounted rechargeable battery 3 is the AA battery 3A. FIG. 12 shows this state.

The aforementioned charger can start charging the rechargeable battery 3 based on discrimination of the type of the rechargeable battery 3 that is mounted in the battery mounting portion 2, and additionally on detection of an abnormality of the rechargeable battery 3 by its battery voltage. The reason is that, in the state where the charging switch 18 is turned OFF, after a battery state, e.g., whether the battery is abnormal or not based on its battery voltage, is detected based on detection of the voltage of the MA battery 3B or AA battery 3A that is mounted in the battery mounting portion 2, the charger turns the charging switch 18 to ON and then can start charging the rechargeable battery 3. For example, the charger can perform control for an abnormal battery, low voltage battery, and normal battery. In a case in which a battery has an abnormally low battery voltage, the charger detects the battery as an abnormal battery, and stops charging the battery. In the case where a battery has a battery voltage that is lower than a specified voltage, the charger detects the battery as a low voltage battery, and charges the battery not in a quick charging manner but in a normal charging manner. In the case where a battery has a battery voltage that is within a predetermined voltage range, the charger detects the battery as a normal battery, and starts charging the battery in a quick charging manner.

It is not always necessary for the charger according to the present invention to detect ON/OFF of the discrimination switch mechanism based on detection of voltage of each of the AA battery charging terminal and the AAA battery charging terminal. When a AA battery is mounted, the discrimination switch mechanism is turned to OFF, and its battery voltage is not provided to the AAA battery charging terminal. On the other hand, when a AAA battery is mounted, the discrimination switch mechanism is turned to ON, and its battery voltage is provided to the AA battery charging terminal. Accordingly, it is possible to discriminate between ON of the discrimination switch mechanism when the battery voltage is provided from the AAA battery charging terminal, and OFF of the discrimination switch mechanism when the battery voltage is not provided from the AAA battery charging terminal.

When the control circuit 6 detects ON of the discrimination switch mechanism 5 and then determines that the AAA battery 3B is mounted to the battery mounting portion 2, the control circuit 6 sets charging current provided from the power circuit 17 at AAA battery charging current as the suitable charging current for the AAA battery 3B and then turns the charging switch 18 to ON to charge the AAA battery 3B. When the charging switch 18 is turned to ON, the AAA battery charging current provided from the power circuit 17 is provided to the AAA battery charging terminal 9 via the AA battery charging terminal 8. Thus, the AAA battery 3B in contact with the AAA battery charging terminal 9 is charged. On the other hand, when the control circuit 6 detects OFF of the discrimination switch mechanism 5 and then determines that the AA battery 3A is mounted to the battery mounting portion 2, the control circuit 6 sets charging current provided from the power circuit 17 at AA battery charging current as the suitable charging current for the AA battery 3A, and then turns the charging switch 18 to ON to charge the AA battery 3A. The terminal of the AA battery 3A is in contact with the AA battery charging terminal 8. Thus, the power circuit 17 provides power to the AA battery 3A through the AA battery charging terminal 8, and charges the AA battery 3A.

Figure 14:
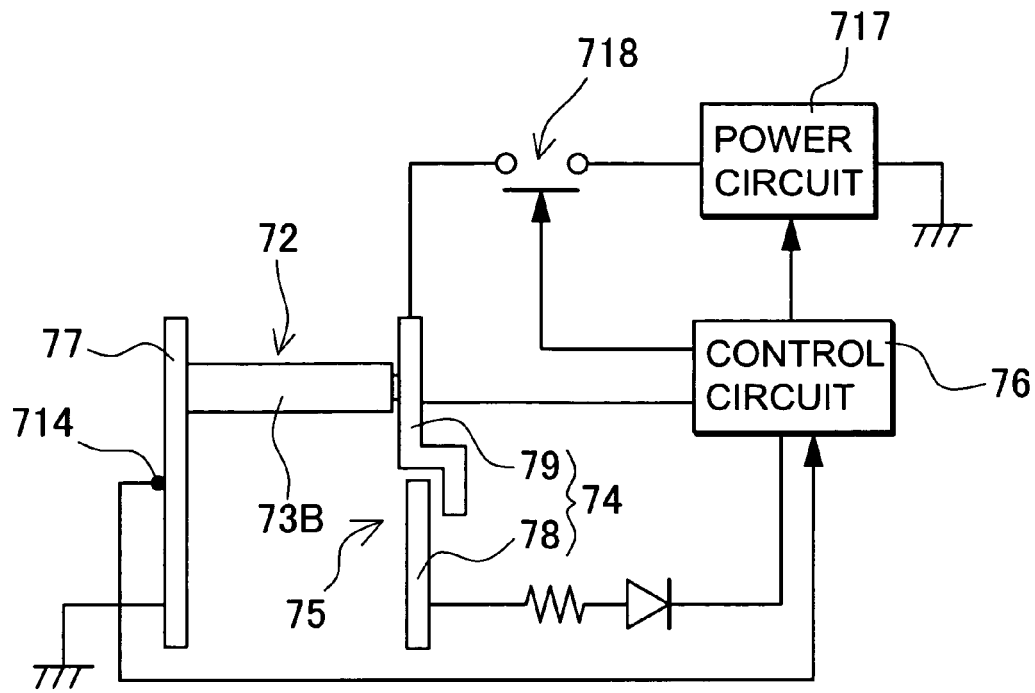
FIG. 14 is a circuit diagram showing a charger according to another embodiment of the present invention, with a AAA battery being mounted thereto.
Figure 15:
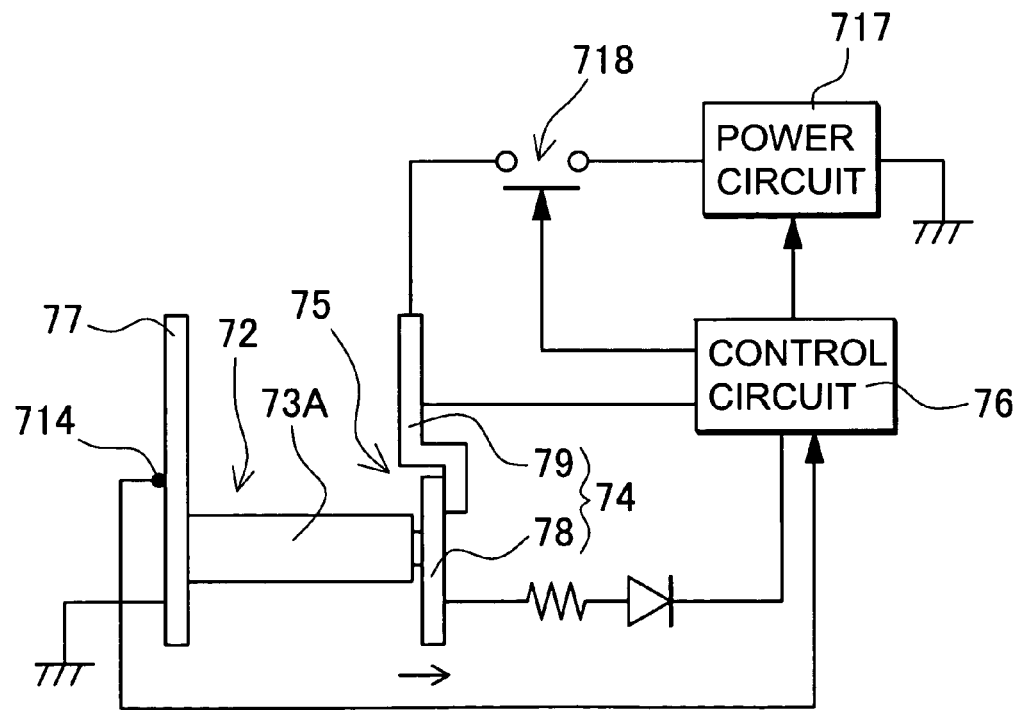
FIG. 15 is a circuit diagram showing the charger according to another embodiment of the present invention, with a AA battery being mounted thereto.
Figure 16:
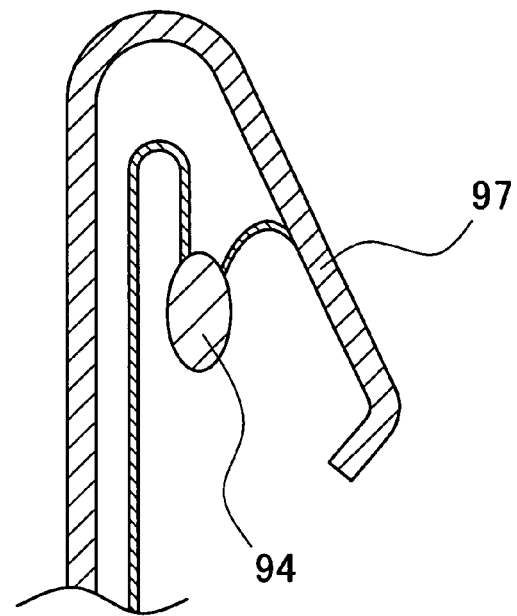
FIG. 16 is a cross-sectional view showing a connection structure between a charging terminal and a temperature sensor in an exemplary charger.
Figure 17:
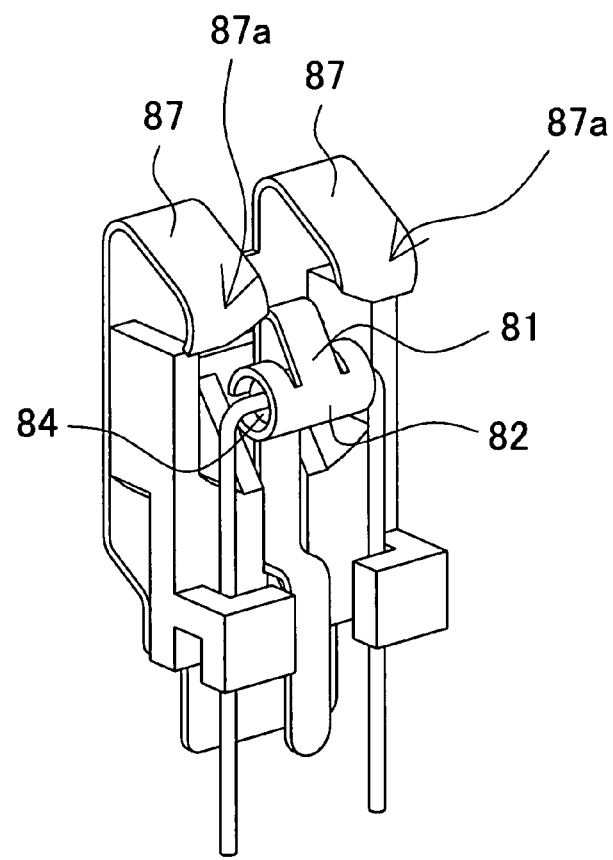
FIG. 17 is a perspective view showing a temperature sensor in another exemplary charger.

The aforementioned charger has the configuration in which, when the AAA battery 3B is mounted, the discrimination switch mechanism 5 is turned to ON, on the other hand, when the AA battery 3A is mounted in place of the AAA battery 3B, the discrimination switch mechanism 5 is turned to OFF. However, the charger according to the present invention may have the configuration in which, when a AA battery 73A is mounted, a discrimination switch mechanism 75 is turned to ON, and when a AAA battery 73B is mounted in place of the AA battery 73A, the discrimination switch mechanism 75 is turned to OFF, as shown in FIGS. 14 and 15.

Note that, in the embodiment shown in these figures, components that are the same as or similar to those of the foregoing embodiment are denoted by reference numerals with the same last digit(s) of the reference numerals except the first one digit of numerals and their description is omitted.

In the charger shown in these figures, a terminal of the AAA battery 73A to be mounted to a battery mounting portion 72 presses a AA battery charging terminal 78, and thus, the AA battery charging terminal 78 comes into contact with a AAA battery charging terminal 79. As a result, the discrimination switch mechanism 75 is turned to ON. In the case where the AAA battery 73B is mounted in place of the AA battery 73A, the AA battery charging terminal 78 is not pressed. Accordingly, the AA battery charging terminal 78 is deviated away from and comes out of contact with the AAA battery charging terminal 79. As a result, the discrimination switch mechanism 75 is turned to OFF.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2005-285639 filed in Japan on Sep. 29, 2005, the content of which is incorporated herein by reference.

What is claimed is:

1. A charger comprising:
   a case that has a battery mounting portion for detachably mounting a rechargeable battery to be charged;
   a charging circuit, disposed inside the case, for charging the rechargeable battery mounted to the battery mounting portion;
   a first charging terminal that is electrically connected to the charging circuit, and contacts one of a positive terminal and a negative terminal of the rechargeable battery mounted to the battery mounting portion to charge the battery; and
   a second charging terminal that is opposite in polarity to the first charging terminal and is electrically connected to the charging circuit,
   wherein the first charging terminal has a nip portion that is formed by bending a metal plate in a folding manner such that parts of the metal plate are opposed, and a temperature sensor is disposed in the nip portion,
   wherein the temperature sensor disposed in the nip portion detects the battery temperature in a non-contact state with the terminal of the rechargeable battery through the intermediary of the metal plate of the first charging terminal in contact with the terminal of the rechargeable battery, and both surfaces of the temperature sensor are nipped by the nip portion of the first charging terminal.

2. The charger according to claim 1, wherein the temperature sensor is a film-type temperature sensor.

3. The charger according to claim 2, wherein the film-type temperature sensor is composed of a temperature sensing element that is interposed between two sheets of plastic films.

4. The charger according to claim 1, wherein the first charging terminal, with the temperature sensor disposed in the nip portion, contacts the negative terminal of the rechargeable battery.

5. The charger according to claim 1, wherein the first charging terminal with the temperature sensor disposed in the nip portion, contacts a flat terminal of the rechargeable battery.

6. The charger according to claim 1, wherein the nip portion of the first charging terminal is located on the back side of the first charging terminal with respect to the rechargeable battery.

7. The charger according to claim 1, wherein the first charging terminal includes a contact portion that contacts the rechargeable battery and is branched in two parts, wherein each of the branched parts is provided with a projection that protrudes toward the terminal at an edge surface of the battery.

8. The charger according to claim 1, wherein the first charging terminal includes an elastic arm portion, wherein the fore end of the elastic arm portion is folded toward the back side of the elastic arm portion to form the nip portion.

9. The charger according to claim 8, wherein the first charging terminal includes a contact portion that contacts the rechargeable battery, wherein the fore end of the contact portion is folded toward the back side of the contact portion by bending such that the fore end is arranged close to the back surface of the elastic arm portion to form the nip portion.

10. The charger according to claim 1, further comprising a fan for forcedly blowing cooling air on the battery mounting portion to cool the rechargeable battery, wherein the fan is disposed inside the case.

11. The charger according to claim 1, further comprising a fan disposed in the case for forcedly blowing cooling air on the rechargeable battery in the battery mounting portion, wherein the bottom of the battery mounting portion has a ventilation opening that allows cooling air blown by the fan to pass to the rechargeable battery.

12. A charger comprising:
    a case including a battery mounting portion for detachably receiving a rechargeable battery to be charged, the battery mounting portion having a bottom portion provided with at least one ventilation opening;
    a fan disposed in the case for forcedly blowing cooling air, via the ventilation opening, to cool the rechargeable battery received in the battery mounting portion;
    a charging circuit, disposed inside of the case, for charging the rechargeable battery received in the battery mounting portion;
    a first charging terminal electrically connected to the charging circuit, the first charging terminal contacting one of a positive terminal and a negative terminal of the rechargeable battery received in the battery mounting portion to charge the battery;
    a second charging terminal electrically connected to the charging circuit, the second charging terminal being opposite in polarity to the first charging terminal; and
    a temperature sensor held by the first charging terminal,
    wherein the first charging terminal defines a nip portion that is formed by bending a metal plate in a folding manner such that parts of the metal plate are opposed to each other, and the temperature sensor is disposed in the nip portion,
    wherein the temperature sensor is operable to detect the battery temperature through the intermediary of the metal plate of the first charging terminal, which is in contact with the terminal of the rechargeable battery,
    wherein the nip portion is located on a back side of the first charging terminal with respect to the rechargeable battery, and
    wherein the first charging terminal is disposed outwardly of the ventilation opening.

13. The charger according to claim 12, wherein the bottom portion of the battery mounting portion is provided with a plurality of ventilation openings that are disposed between the first and second charging terminals so that air cannot be blown by the fan directly on the first charging terminal.

* * * * *